United States Patent [19]
Bechevet et al.

[11] Patent Number: 5,169,504
[45] Date of Patent: Dec. 8, 1992

[54] METHOD FOR PREPARING A MAGNETO OPTIC MEMORY

[75] Inventors: Bernard Bechevet, Claix; Didier Challeton, St. Egreve; Bernard Rolland, Meylan; Bruno Vallon, Grenoble, all of France

[73] Assignee: Commissariat a l'Energie Atomique, Paris, France

[21] Appl. No.: 615,302

[22] Filed: Nov. 19, 1990

[30] Foreign Application Priority Data

Dec. 6, 1989 [FR] France .................. 89 16117

[51] Int. Cl.$^5$ .................. G11B 11/00; G11B 13/04
[52] U.S. Cl. .................. 204/192.26; 204/192.2; 427/130; 427/166
[58] Field of Search .................. 204/192.2, 192.26; 427/130, 164–166, 372.2

[56] References Cited

U.S. PATENT DOCUMENTS 4,608,142  8/1986  Gomi et al. .................. 204/192.2

FOREIGN PATENT DOCUMENTS 0196332  10/1986  European Pat. Off. .
3519070  12/1985  Fed. Rep. of Germany .
2579814  10/1986  France .
2127611  4/1984  United Kingdom .
2136647  9/1984  United Kingdom .
2183413  6/1987  United Kingdom .

Primary Examiner—Aaron Weisstuch
Attorney, Agent, or Firm—Pearne, Gordon, McCoy & Granger

[57] ABSTRACT

Method for preparing a magneto optic memory comprising on a support (22), such as one made of glass, metal or a plastic material, a planar sensitive film (21) of magneto optic material for receiving at each point the recording of one of the two binary digits 0 and 1 in the form of small domains juxtaposed and magnetized perpendicular to the plane of the firm in one of the two possible directions with respect to the latter, the sensitive film (21) being deposited by a cathodic or other evaporation process of a magentic oxide selected from the group including spinel ferrites, hexaferrites and ferrimagnetic garnets, the preceding deposition being followed by a crystallization of the amorphous regions of said film with the aid of an annealing, wherein at least one reflective film (28) and/or one film constituting a thermal screen is inserted between the support (22) and the sensitive film (21) and wherein the annealing is a fast annealing, namely of a few seconds at a temperature of between 600° C. and 650° C.

4 Claims, 2 Drawing Sheets

METHOD FOR PREPARING A MAGNETO OPTIC MEMORY

BACKGROUND OF THE INVENTION

1. Field of the Invention

The present invention concerns the storing of information in binary form with a view to using this information by various data processing or video systems making use of such memories.

2. Description of Related Art

Generally speaking, these memories, known as magneto optic memories, are described, for example, in the following publications: "Amorphous transition metal-rare earth alloy films for magneto optic recording" (Fred E. Luborsky, General Electric Corporate Research and Development, *Mat. res. soc. symp. Proc.* Vol. 80, 1987, p.375) and "Les Nouvelles Techniques de Stockage de Donnees" (New Techniques for Data Storage) (For "La Science," Dec. 1987, p.64).

First of all, there follows a description of the known general principle of such magneto optic memories with reference to the diagrams of FIGS. 1 and 2, the latter figure representing the magneto optic disk of FIG. 1 on larger scale.

The device of FIG. 1. mainly comprises a disk made of a magneto optic material 2 able to rotate about its vertical axis XY and a read/write system comprising a laser diode 4, a polarizer 6, an analyzer 8 and a detector 10. A semi-transparent mirror 12, slanted at 45°, is inserted in the path of the light which moves from the laser diode 4 as far as the surface of the magneto optic disk 2. Focussing lenses 14 are also provided close to the magneto optic disk 2. Then the writing and reading of the disk 2 is carried out with the aid of the light of the laser diode 4 which is able to write and read the data on the erasable and rerecordable magnetic support 2. To this effect, and for writing, a magnetic field coil 16 is also provided under the disk 2 so as to subject the latter to an intense magnetic field with a vertical axis, that is, in this case, perpendicular to the plan of the disk 2. The magnetic material constituting the disk 2 has an extremely intense coercive field at ambient temperature, but which reduces rapidly at high temperatures. Accordingly, when under the action of the laser beam emitted by the diode 4, a write domain of the disk 2 is heated intensely, the coercive field reduces drastically in this domain so that the magnetic field, emitted by the coil 16 and to which the disk is subjected, makes it possible to magnetically polarize the heated part and to give the domain in question a direction perpendicular to the surface of the disk 2, this direction being, however, a specific and known direction. Thus, it can be readily understood that if a magneto optic disk is used which has bee previously magnetized in a uniform direction perpendicular to the surface (FIG. 2) the implementation of the diagrammatic device of FIG. 1 enables the magnetized domains to be recorded side by side in a direction perpendicular to the disk 2, but whose magnetization is sometimes directed towards the lower face and sometimes directed towards the upper face (18 and 20, FIG. 2) In this way, the writing of the two binary digits 0 and 1 are embodied on the surface of the disk 2. FIG. 2 shows the support 22 made of glass and a reflecting film 24 which complete the structure of the optical memory disk.

In order to read this disk, resort is made to either the known Kerr effect or the Faraday effect. In other words, each of the domains is observed with the aid of the lenses 14 and a semi-transparent mirror 12 system by seeking with the aid of the analyzer 8 and the detector 10 whether the polarization plane to which the incident light has been subjected by the polarizer 6 has turned or not and in what direction inside the reflected beam. By thus detecting the rotations of the polarization plane of the radiation reflected onto the film (Kerr effect) or reflected after crossing the film (Faraday effect), for each analyzed domain, a determination is made as to whether this corresponds to the recording of a binary digit 0 or a binary digit 1.

With respect to the information storage memories with the aid of magnetic materials, such as $Cr_2O_3$, $Fe_2O_3$, FeNi, etc., the optical memories present a certain number of characteristics rendering them to be more high performing and thus more advantageous. These characteristics include a storage capacity at least ten times greater than the storage capacity of magnetic memories, allow for easy optical reading and a reading head which is spaced from the disk (such as about one millimeter), which significantly reduces the risk of deterioration of the surface of the memories as is the case with currently existing magnetic memories. Furthermore, optical memories are relatively insensitive to dust and may be embodied on disks or movable supports.

Most of the disks or magneto optic memories produced up until now are made up of amorphous materials of the "rare earth/transition metal" type, such as compound Gd-Tb-Fe.

The Applicants have found that it was possible to further increase the performance of magneto optic memories by using oxides (ferrimagnetic garnets, hexaferrites, spinel ferrites) as a sensitive material, provided they are disposed on the support in a crystalline form. In accordance with these conditions, the preceding oxides possess the following advantages:

they possess extremely good chemical resistance, whereas amorphous metallic ones are oxidizable;

their magneto optic properties are greater (Faraday rotation is more than $5 \times 10^6$ degrees of rotation per meter of sensitive film traversed);

it is also possible to use them with shorter wavelengths and accordingly obtain a greater recording density. For example, it is relatively simple to work with such memories with the aid of light of a wavelength of 500 nanometers.

Finally, their solidity does not require the presence of a protection film.

However, the production of such crystallized oxide memories, whose crystallization temperature is extremely high ($T_c > 500°C$.), poses the problem of the compatibility of the support which, during the heating time required to produce crystallization, needs to resist temperatures as high as above.

SUMMARY OF THE INVENTION

The object of the present invention is to provide a method for preparing such magneto optic memories and which, with the aid of simple implementation means, makes it possible to resolve the preceding problem and in particular, enables using ordinary glass supports not resistant to high temperatures.

This method for preparing a magneto optic memory comprising on a support (22), such as glass, metal or a plastic material, a planar, sensitive film of a magneto optic material for receiving at each point the recording of one of the two binary digits 0 and 1 in the form of small domains juxtaposed and magnetized perpendicular to the plane of the film in one of two possible directions with respect to the latter, the sensitive film (21) being constituted by depositing by cathodic o other evaporation of a magnetic oxide selected from the group including spinel ferrites, hexaferrites and ferrimagnetic garnets, this depositing being followed by a crystallization of the amorphous film with the aid of an annealing, is characterized in that at least one reflecting film (28) and/or one film constituting a thermal screen (30) is inserted between the support (22) and the sensitive film (21), and in that the annealing is a fast annealing of several seconds at a temperature of between 600° C. and 650° C.

The main feature of the method of the present application consists of providing the support with thermal protection, the support comprising, for example, a metallic reflective film, such as Cr, Al or Ti, and a $SiO_2$ thermal screen film. Thus, the operation for fast annealing at a temperature of about 650° C. or more, by means of which all the magnetic oxides deposited by cathodic evaporation or other means are fully crystallized, does not damage the support of the memory, even if it is thermally fragile. It is advantageous to carry out this annealing for several seconds at modulated power.

Another feature of the invention, is used in the method for preparing a magneto optic memory of the present invention.

According to the invention, it is possible to further improve the thermal conditions of the fast annealing by placing the magneto optic material on a cooled plate which then constitutes a thermal well able to readily absorb a portion of the heat developed by the lamps used for annealing.

According to one significant characteristic of the present invention, the spinel ferrites used to constitute the sensitive film generally have the formula $A_xB_yFe_2O_4$, a formula in which:

$$x+y=1$$

and

A and B are selected from the following metals: Ni, Mn, Zn, Fe, Co, Cu, Mg, Li, and substituted compounds.

According to another characteristic of the method, when the oxides used for the sensitive film are hexaferrites, the latter usually have the formula $A_yA'_zB_xFe_{12-}O_{19}$, a formula in which:

$$y+z=1$$

and

A and A' are selected from the following: Ba, Sr, Bi, La, Pb, and Sc.

B is selected from the following metals: Co, Mn, Ti, Zn, Al, Cu, Ga, and compounds with iron substituted.

Finally, when the oxides used are ferrimagnetic garnets, they generally have the formula $A_xB_yFe_{5-z}C_zO_{12}$, a formula in which:

$$x+y=3$$

A is a rare earth or yttrium,
B is selected from Bi and Ca,
C is selected from the following metals: Al, Ga, Si, Ge, Sc, Tl.

BRIEF DESCRIPTION OF THE DRAWINGS

The present invention will be more fully understood with reference to the following description and drawings, wherein.

DETAILED DESCRIPTION OF THE PREFERRED EMBODIMENTS

Figure 1:
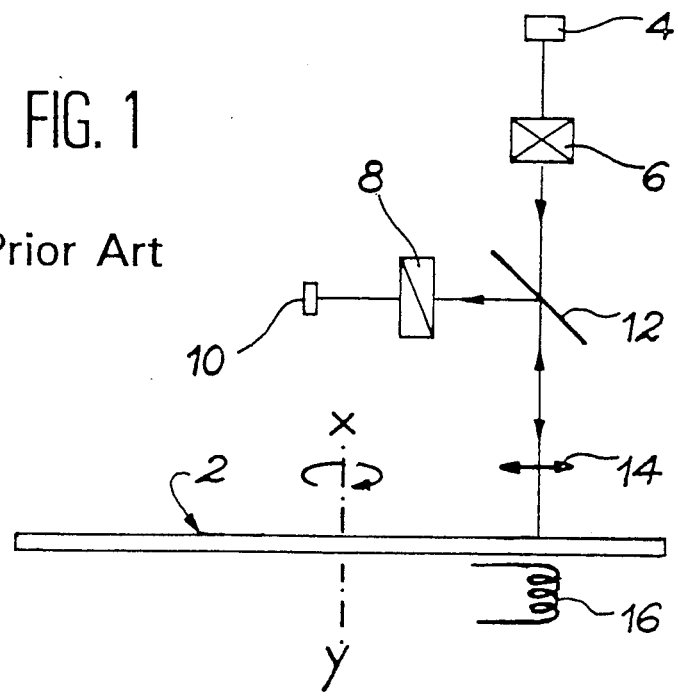
FIG. 1 shows a prior art magneto optic memory.
Figure 2:
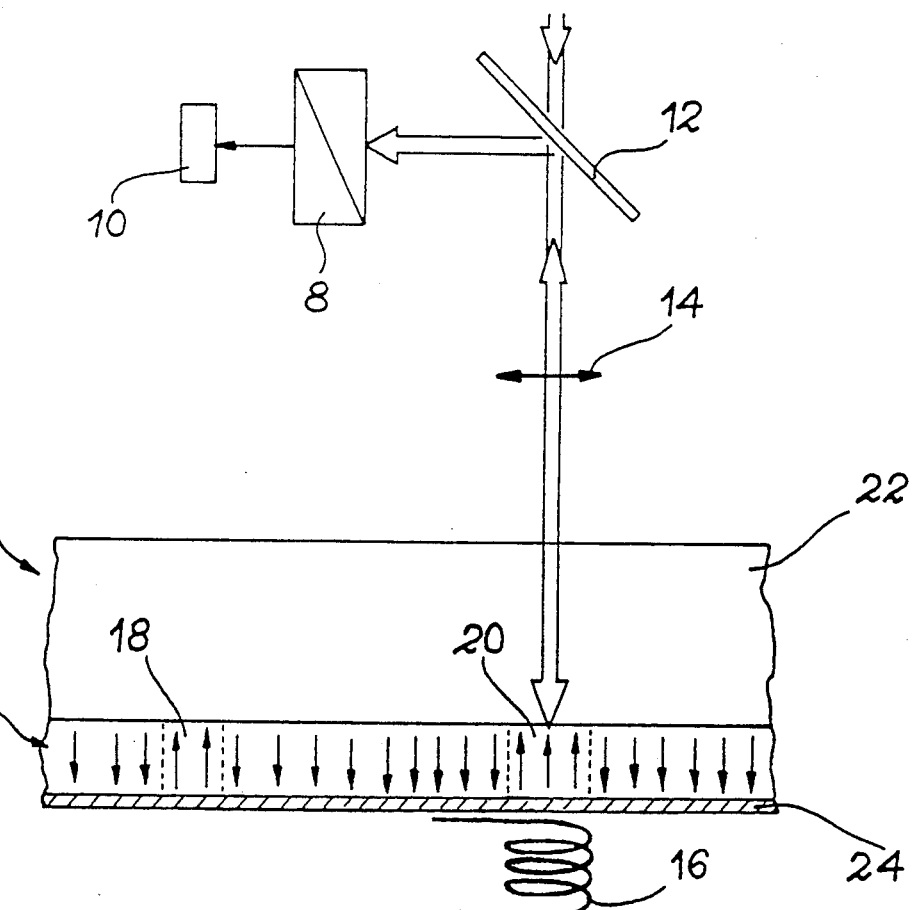
FIG. 2 shows the prior art magneto optic disc of FIG. 1, on a larger scale.
Figure 3:
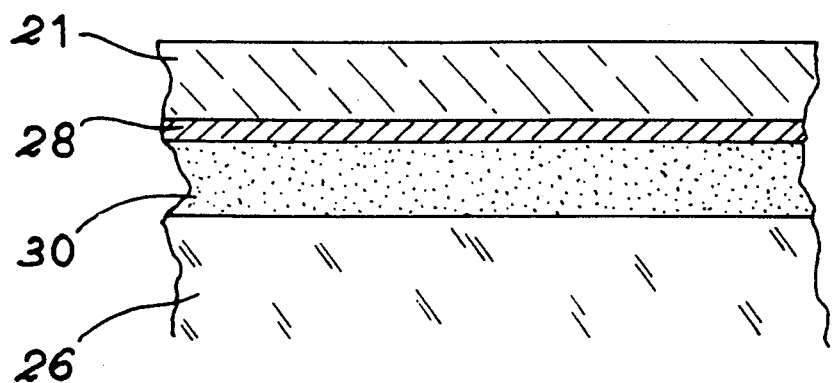
FIG. 3 shows a magneto optic film on its substrate provided with a reflective film and a thermal screen film.
Figure 4:
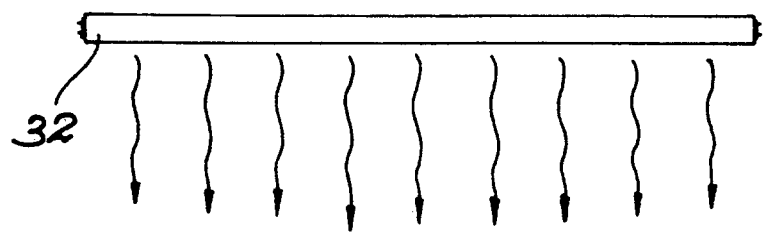
FIG. 4 a diagram of a possible installation for fast lamp heating.
Figure 4:
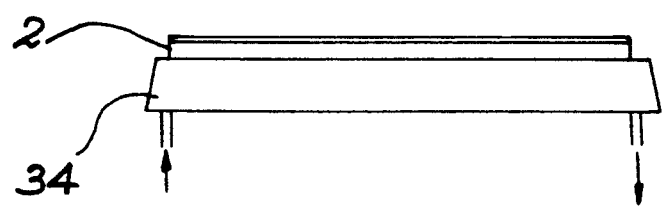
Figure 5:
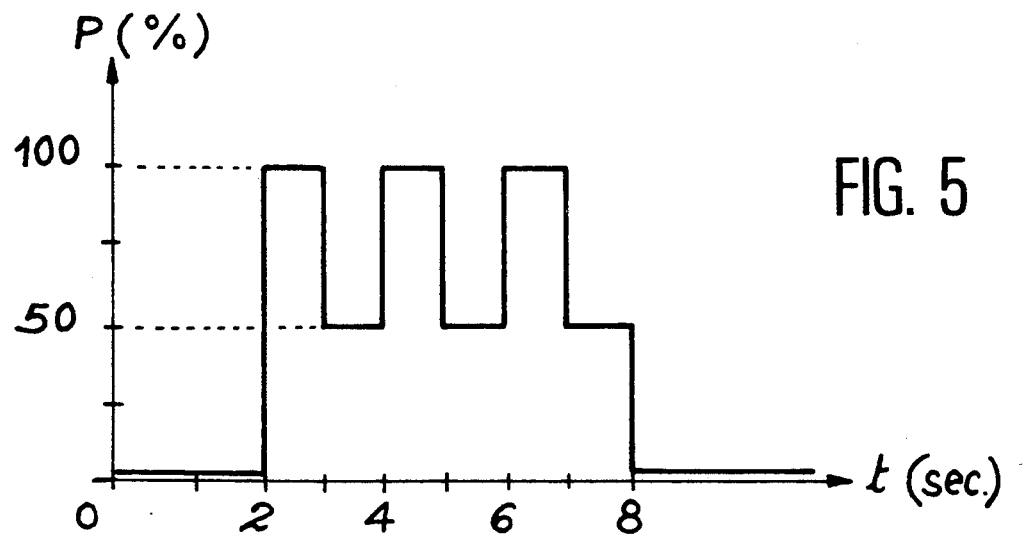
FIG. 5 shows a modulated-power fast annealing program.

With reference to FIGS. 3-5, there now follows several examples of the ways and means to put into practice the method of the invention, this description being given purely by way of illustration and being in no way restrictive.

FIG. 3 shows a magneto optic film 21 and its glass substrate 26. In accordance with the invention, between the magneto optic film 21 and the substrate 26, there is a reflective film 28 made of a metal selection from chromium, aluminum, and titanium as well as a silica $SiO_2$ film 30 constituting a thermal screen designed to protect the substrate 26 during the operation for crystallizing the deposited magneto optic oxides.

FIG. 4 diagrammatically shows a fast lamp heating installation for carrying out annealing. This figure also shows a magneto optic disk 2 irradiated by a bank of heating lamps 32 and situated on a plate 34 cooled, for example, by a water current and constituting a thermal well which makes it possible to gradually absorb the heat derived from the bank of lamps 3 which has traversed the magneto optic disk 2.

FIG. 5 shows a modulated power time-controlled fast annealing program. The time measured in seconds is indicated along the abscissa and the thermal power transmitted to the magneto optic disk is given on the ordinate. As the figure shows, the modulations of the power develope by strobes of about one second, during which the power oscillates from 100% to 50% of its maximum value. Such power modulations generally make it possible to obtain at a temperature exceeding 500° C., and most frequently close to 650° C., a complete crystallization of the mass of the oxides deposited by cathodic evaporation without resulting in destruction of the support.

According to the invention, the magneto optic memory disks obtained according to the previously described method may, if required, receive a magneto optic film on each of their two faces.

By varying the parameters of the annealing (maximum power, modulation of this power, etc.), it is possible to vary in significant advantageous proportions the crystallinity of the magneto optic film and, in particular, the size of the grains of this film. In fact, the faster the annealings, the smaller the size grading of the film, which makes it possible to significantly increase in certain cases the magneto optic qualities of the film. Secondly, it is possible by using the method of the invention to obtain films exhibiting significant homogeneity.

By way of example, magneto optic memories have been produced by the method of the invention under the following conditions:

The cathodic evaporation operation was performed under either a.c. or radio frequency conditions and the targets were disks with a diameter of about 100 mm. They and the sensitive film were both constituted by the compound $Bi_2DyGa_{0.3}Fe_{4.7}O_{12}$. The residual vacuum prior to evaporation reached $2\times7^{-7}$ millitorrs and the atmosphere was composed of argon and oxygen in a ratio of 8 to 1. The radio frequency power was 3.8 $W/cm^2$ and the depositing rate was 0.75 microns/hour.

The temperature of the deposition substrate could be selected at 300° C. so as to obtain an amorphous deposit.

The fast annealing operation has been conducted with the aid of a tungsten filament lamp furnace or with the aid of an argon laser beam, the support resting on a cooled plate acting as a thermal well. The luminous pulse had a time-modulated power according to the program diagrammatically shown in FIG. 5.

Thus, it was possible to obtain a full crystallization of the magneto optic film without destroying the glass constituting the substrate.

What is claimed is:

1. A method for preparing a magneto optic memory comprising on a support chosen from glass, metal, or plastic, a planar sensitive film of a magneto optical material intended to receive at each point a recording of one of the two binary digits 0 and 1 in the form of small domains juxtaposed and magnetized perpendicular to the plane of the film in one of the two possible directions with respect to the latter, the sensitive film being deposited by a cathodic or other evaporation process of a magnetic oxide selected from spinel ferrites, hexaferrites, and ferrimagnetic garnets, the deposition step being followed by a crystallization of the amorphous regions of said film by means of an annealing step, wherein at least one of a reflecting film and a film constituting a thermal screen is inserted between the support and the sensitive film, and wherein the annealing is a fast annealing of several seconds at a temperature of between 600° C. and 650° C.

2. A method for preparing a magneto optic memory according to claim 1, wherein the annealing is a fast lamp annealing, the sensitive film of a magneto optic material being disposed on a cooled plate constituting a thermal well so as to absorb the heat.

3. A method for preparing a magneto optic memory according to claim 2, wherein the fast annealing takes place in several seconds at modulated power.

4. A method for preparing a magneto optic memory according to any one of claims 1 to 3, wherein the reflecting film for protecting the support is a metal film and wherein the thermal screen film is made of silica.

* * * * *